United States Patent [19]

Ohtomi

[11] Patent Number: 4,894,597
[45] Date of Patent: Jan. 16, 1990

[54] DEBURRING ROBOT

[75] Inventor: Sadayuki Ohtomi, Inazawa, Japan

[73] Assignee: Mitsubishi Denki Kabushiki Kaisha, Japan

[21] Appl. No.: 195,292

[22] Filed: May 18, 1988

[30] Foreign Application Priority Data

May 21, 1987 [JP] Japan .................. 62-124361

[51] Int. Cl.$^4$ .............................. G05B 19/42
[52] U.S. Cl. .................. 318/568.22; 901/41
[58] Field of Search ............ 318/568; 901/41

[56] References Cited

U.S. PATENT DOCUMENTS

| 4,403,281 | 9/1983 | Holmes | 318/568.18 |
| 4,518,307 | 5/1985 | Bloch | 901/45 X |
| 4,777,769 | 10/1988 | McLaughlin et al. | 901/41 X |

FOREIGN PATENT DOCUMENTS 59-201759 11/1984 Japan .
61-159366 7/1986 Japan .

OTHER PUBLICATIONS

Kazerooni et al., "An Approach to Automated Deburring by Robot Manipulators", Journal of Dynamic Systems, Measurement & Control, vol. 108, pp. 354–359, Dec. 1986.

Edsall et al., "Adaptive Control, Learning and Cost Effective Sensor Systems for Robotics or Advanced Automation Systems, Final Report", Covering Apr., 1985–Sep., 1986.

Primary Examiner—William M. Shoop, Jr.
Assistant Examiner—Saul M. Bergmann
Attorney, Agent, or Firm—Leydig, Voit & Mayer

[57] ABSTRACT

A deburring robot capable of adjusting the grinder position in response to detected data of the positions and shapes of the burrs on the workpiece as it carries out the deburring operation. A detector is provided at the robot position where the deburring is performed in order to detect the position and shape of the burr concerned. The detected data thus obtained is compared with the data on the predetermined taught positions of the grinder stored in a controller, so that the correction of the grinder position is effected simultaneously with the deburring operation.

7 Claims, 3 Drawing Sheets

DEBURRING ROBOT

BACKGROUND OF THE INVENTION

This invention relates to a deburring robot, and more particularly relates to a deburring robot which is capable of adjusting the grinder position as it performs deburring, in accordance with burr position data.

FIG. 1 shows a conventional deburring robot of this type. The deburring robot (hereinafter referred to as the robot) comprises an arm-like member 1 and a controller 2 for controlling its motion. The component 1 and the controller 2 are connected with each other through a wire 3. To a wrist 1A at the end of the arm-like member 1 which is movable relative to a pedestal 4 is mounted a grinder 5, which serves to remove burrs 6A on a workpiece 6 secured to a clamping bed 8 in accordance with the positions taught and stored in the controller 2 beforehand. The robot sections move as indicated by the arrows $J_1$ through $J_6$ showing the motions of the joints, each joint being provided with a servomotor (not shown). The position of the grinder 5 in the X-, Y- and Z-axis directions is changed by the motions of the joints $J_1$ to $J_3$ and the direction of the grinder 5 is changed by the motions of the joints $J_4$ to $J_6$. In practice, the positioning of the grinder 5 is effected by means of a microcomputer (not shown) through simultaneous motions of the joints $J_1$ to $J_6$.

Between the grinder 5 and the wrist 1A is provided a pressure sensor 7 for detecting the pressurizing force of the grinding wheel 5A of the grinder 5. This pressure sensor 7 enables the burrs 6A to be removed under a constant pressure. Technical descriptions regarding such a pressure sensor can be found, for example, in "An Approach to Automated Deburring by Robot Manipulators", Transaction of the ASME, Vol. 108, pp, 354–359, (December, 1986).

In a conventional deburring robot as described above, the grinder 5 performs deburring at the points taught beforehand by the controller 2, so that if there are any deviations in the positioning of the work 6 on the clamping bed 8 from the predetermined positions, fluctuations will arise in the amount of burrs removed, resulting in deterioration of the finishing accuracy. As another example, a robot construction is disclosed in Japanese patent laid-open No. 256802/85, in which detection of positional deviations due to backlash and hysteresis in the rotating and sliding sections of the robot is effected by means of, for example, a detector for detecting shaft rotational positions of the rotating sections, the detection values of which enable the points taught to be corrected.

SUMMARY OF THE INVENTION

It is accordingly an object of this invention to provide a deburring robot which is capable of performing deburring with accuracy even when there are unexpected variations in the workpiece positioning.

In the deburring robot in accordance with this invention, a detector is provided in the deburring section for detecting burr positions, and while the deburring operation is being carried out, the grinder positions taught beforehand are adjusted in accordance with any new burr removal positions thus detected by the detector.

In accordance with this invention, the burr positions are measured by means of a detector and if the positions are found to be different from the taught positions, the grinder positions taught beforehand are modified to bring them into agreement with these measurements while the deburring operation is being performed, whereby deburring is effected with high accuracy.

DESCRIPTION OF THE PREFERRED EMBODIMENT

Figure 1:
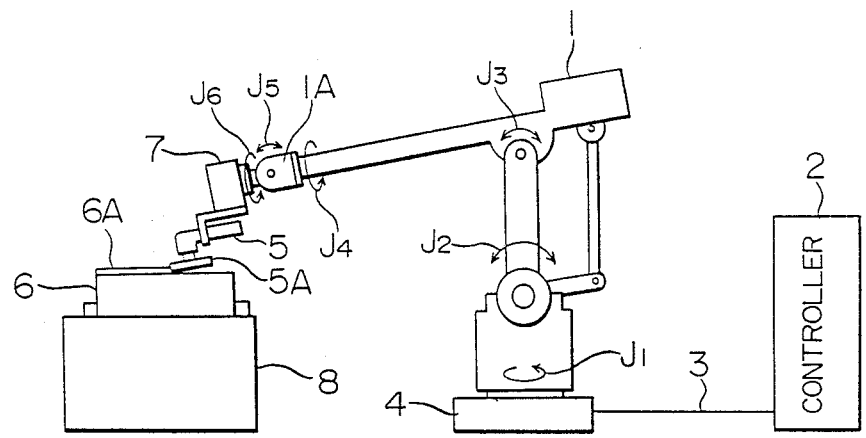
FIG. 1 is a front elevational view of a conventional deburring robot.
Figure 2:
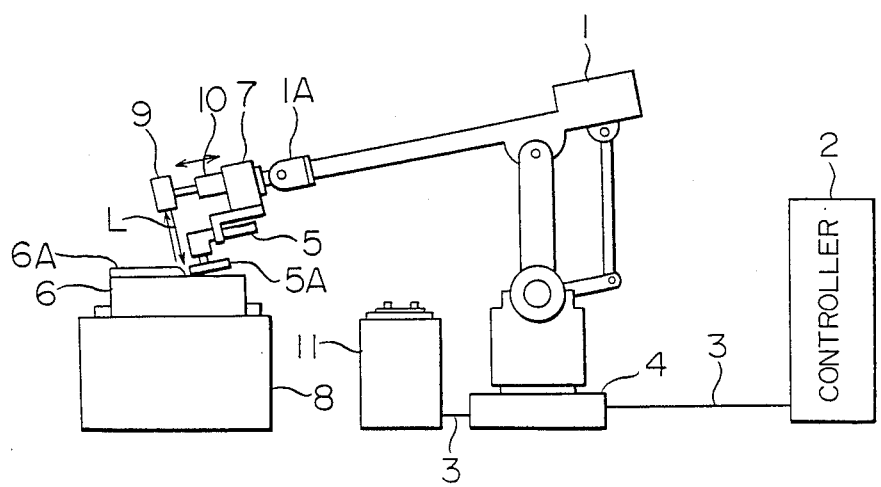
FIG. 2 is a front elevational view of an embodiment of the deburring robot in accordance with this invention.
Figure 3:
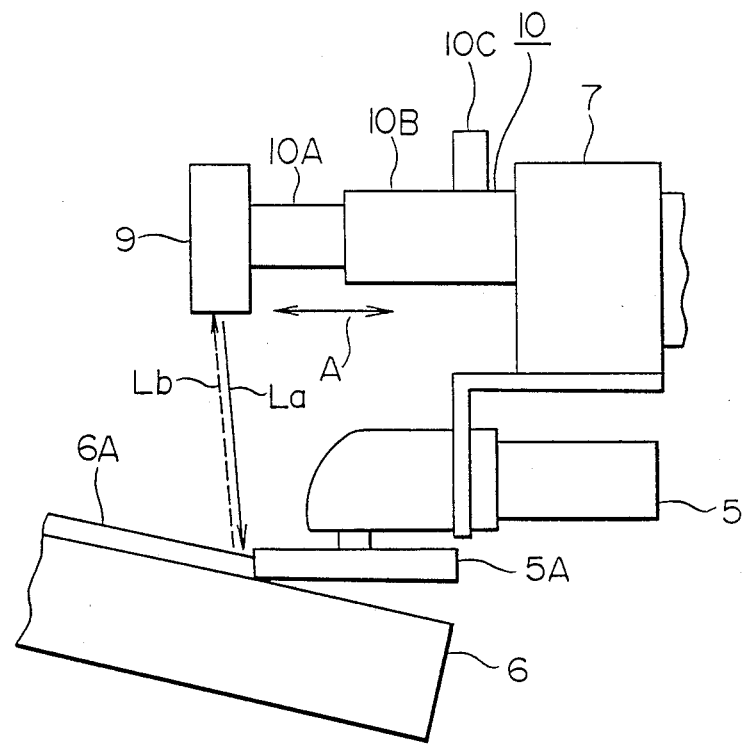
FIG. 3 is an enlarged view of the deburring section of the embodiment shown in FIG. 2.

FIG. 2 shows the construction of a deburring robot in accordance with an embodiment of this invention. In this construction, a detector 9 is provided at the end portion of a pressure sensor 7 in order to detect the position where burr 6A is to be removed and to transmit the detection signal to a controller 2. This detector 9 is mounted on the body through a sensor position adjusting mechanism 10 in such a manner that it can advance or retreat in the radial direction of the wheel 5A of the grinder 5. FIG. 3 is an enlarged view of the deburring section of the robot shown in FIG. 2. In this embodiment, a laser beam sensor utilizing a laser beam is employed as the detector 9. The laser beam sensor 9 irradiates the workpiece 6 with a laser beam La to detect the distance between the laser beam sensor 9 and the workpiece 6 from the reflection Lb of the beam La.

Figure 4:
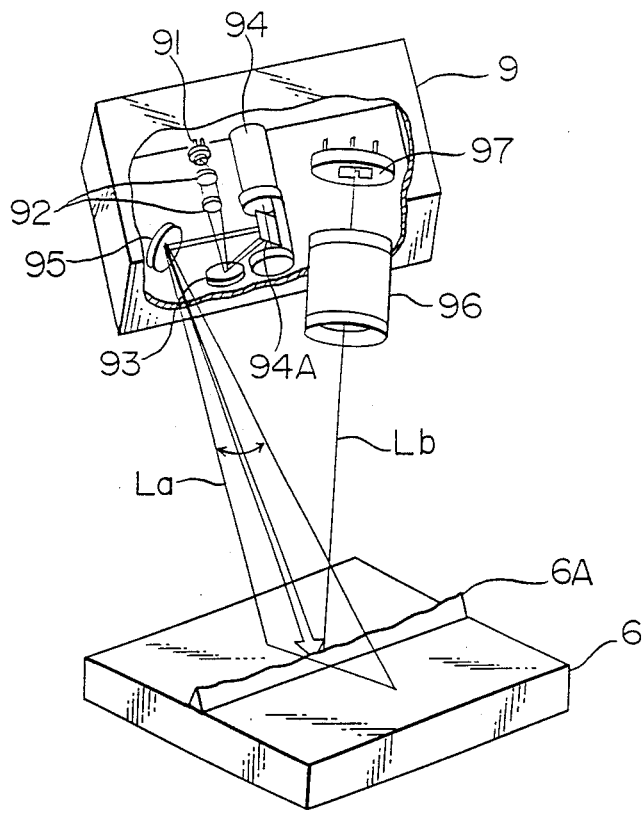
FIG. 4 is a perspective view of a laser beam sensor employed as an embodiment of the detector for detecting the positions and shapes of the burrs to be removed.
Figure 5:
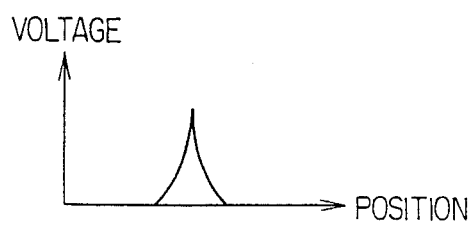
FIG. 5 is a chart showing the output voltage signals from the detector.

As the laser beam sensor 9, the one shown in FIG. 4, for example, may be employed. The laser beam emitted from a semi-conductor laser 91 passes through lenses 92 and is reflected by a reflection mmirror 93, to be applied to a scanning mirror 94A of a galvanometer 94. The laser beam is swung by this scanning mirror 94A with a predetermined period and reflected by an irradiation mirror 95, to be radiated on the burr portion 6A on the workpiece 6 as an irradiation La scanning the burr portion. The reflection Lb, in agreement with the contour of the burr, is received by an optical sensor 97 (hereinafter referred to as the PSD) through a reception lens 96. As shown in FIG. 5, the PSD 97 transduces the laser beam received into a voltage value which it transmits to the controller 2 shown in FIG. 2.

Since the wheel 5A wears out gradually in the course of deburring operations, it is necessary to adjust the position of the laser beam sensor section 9 to take account of changes in the diameter of the wheel 5A. For this purpose, a detector position adjusting mechanism 10 is provided, as shown in detail in FIG. 3, so that the sensor section 9 may come to the best suited position for detecting the burr position. The diameter of the wheel 5A is measured before the deburring operation; for this purpose, the grinder 5 is inserted into a diameter measuring device 11 shown in FIG. 2, which is separately provided so as to be protected from dust. Then the servomotor 10C is driven in accordance with the diameter of the wheel 5A, i.e., data on the outer peripheral position of the wheel 5A, whereby a piston 10A guided by a cylinder 10B is moved to bring the sensor section 9 to the position best suited in the direction of the arrow A shown in FIG. 3. The measuring device 11 for measuring the diameter of the wheels 5A is not peculiar to this invention; any device well known in the art may be employed.

The detection signal thus obtained by means of the laser beam sensor 9 is transmitted to the controller 2 to be recognized there as the burr position data, which is compared with the predetermined points taught beforehand in order to correct the previously taught grinder position while removing the burrs 6A in accordance with the previously detected values. As shown in FIGS. 4 and 5, the reflection Lb makes it possible to detect the position and shape of the burrs concerned as well as the position of the workpiece 6. The detection data thus obtained are compared with the position of the grinder 5 taught and stored beforehand, which enables the position taught to be corrected.

In accordance with the embodiment described above, the detector 9 detects the positions and shapes of the burrs 6A and the workpiece 6; based upon the detection data thus obtained, continuous correction of the positions of the grinder 5 is effected, which, in cooperation with the action of the pressure sensor 7, makes it possible to perform deburring with high accuracy even if the initial work position with respect to the grinder has been inaccurately stored in the controller.

What is claimed is:

1. A deburring robot, operated by a controller storing predetrmined taught position data, for removing burrs remaining on a workpiece, comprising:
    an arm-like member movably mounted on a pedestal;
    a grinder mounted onto said arm-like member and having a grinding wheel for removing the burrs remaining on the workpiece;
    a detecting means mounted on said arm-like member in the vicinity of said grinder for detecting the position of the workpiece and the positions and shapes of the burrs remaining thereon; and
    a positioning means for positioning said grinder in accordance with said detecting means by correcting the predetermined taught position data.

2. A deburring robot according to claim 1 wherein said detecting means comprises a laser beam sensor which generates a laser beam, said sensor including a movable scanning element which swings the laser beam and irradiates the workpiece with the laser beam scanning the surface thereof.

3. A deburring robot according to claim 1 further comprising:
    a measuring means provided separately from said arm-like member for measuring a diameter of said grinding wheel; and
    a second positioning means for supporting and adjustably positioning, in a grinding wheel radial direction, said detecting means to position said detecting means in a position best suited for detecting the burr position in accordance with the data from said measuring means.

4. A deburring robot, operated by a controller storing predetermined taught position data, for removing burrs remaining on a workpiece, comprising:
    an arm-like member movably mounted on a pedestal;
    a wrist movably mounted to an end of said arm-like member;
    a grinder mounted onto said wrist and having a grinding wheel for removing the burrs remaining on the workpiece;
    a pressure detecting means provided between said wrist and said grinder for detecting a biasing force acting on said grinding wheel in order to keep the biasing force constant;
    a supporting means, formed separately from said arm-like member, for fixedly supporting the workpiece in a predetermined position;
    a measuring means, formed separately from said arm-like member, for measuring a diameter of said grinding wheel;
    a position detecting means mounted on said arm-like member in the vicinity of said grinder for detecting the positions of the workpiece and the burrs remaining thereon;
    a first positioning means for positioning said grinder in accordance with position data obtained by said position detecting means by correcting the predetermined taught position data; and
    a second positioning means for supporting and adjustably positioning, in a grinding wheel radial direction, said position detecting means to locate said position detecting means in a position best suited for detecting the burr position in accordance with the data from said measuring means.

5. A deburring robot according to claim 4 wherein said position detecting means comprises a laser beam sensor which generates a laser beam, said sensor including a movable scanning element which swings the laser beam and irradiates the workpiece with the laser beam scanning the surface thereof.

6. A deburring robot according to claim 4 wherein said second positioning means comprises a piston on one end of which said position detecting means is mounted, a cylinder one end of which is fixed to said arm-like member and which guides said piston, and a servomotor which moves said piston in accordance with the data from said measuring means.

7. A deburring robot according to claim 1 further comprising a pressure control means connected to said grinder for detecting and maintaining constant a biasing force acting on said grinding wheel.

* * * * *